United States Patent
Weder

(10) Patent No.: US 8,302,347 B2
(45) Date of Patent: Nov. 6, 2012

(54) PREFORMED DECORATIVE WRAPPER AND METHODS OF USE THEREOF

(75) Inventor: Donald E. Weder, Highland, IL (US)

(73) Assignee: Wanda M. Weder & William F. Straeter, Highland, IL (US), not individually but solely as Trustees of The Family Trust U/T/A dated Dec. 8, 1995

( * ) Notice: Subject to any disclaimer, the term of this patent is extended or adjusted under 35 U.S.C. 154(b) by 0 days.

(21) Appl. No.: 12/782,780

(22) Filed: May 19, 2010

(65) Prior Publication Data

US 2010/0223887 A1 Sep. 9, 2010

Related U.S. Application Data

(60) Division of application No. 12/215,797, filed on Jun. 30, 2008, now abandoned, which is a continuation of application No. 11/439,772, filed on May 24, 2006, now abandoned.

(60) Provisional application No. 60/684,023, filed on May 24, 2005.

(51) Int. Cl.
*A01G 9/02* (2006.01)

(52) U.S. Cl. .......................................... 47/72

(58) Field of Classification Search ................ 47/72
See application file for complete search history.

(56) References Cited

U.S. PATENT DOCUMENTS

| | | |
|---|---|---|
| D5,120 S | 7/1871 | Snow |
| 797,175 A | 8/1905 | Collenburg |
| 1,212,428 A | 1/1917 | Watson |
| 1,520,647 A | 12/1924 | Hennegan |
| 1,892,818 A | 1/1931 | Trew |
| 1,794,212 A | 2/1931 | Snyder |
| 1,868,853 A | 7/1932 | Sievers |
| 2,355,559 A | 8/1944 | Renner |
| 2,540,707 A | 2/1951 | Beukelman |
| 2,774,187 A | 12/1956 | Smithers |
| 2,785,508 A | 3/1957 | Coleman, Jr. |
| 2,845,735 A | 8/1958 | Werner |
| 3,021,046 A | 2/1962 | Pullen |
| 3,022,605 A | 2/1962 | Reynolds |
| 3,058,263 A * | 10/1962 | Reynolds ........................ 47/80 |
| 3,362,105 A | 1/1968 | Steiger |
| 3,488,022 A | 1/1970 | Vittori |
| 3,748,781 A | 7/1973 | Erling |
| 3,767,104 A | 10/1973 | Bachman et al. |
| 3,852,913 A | 12/1974 | Clendinning et al. |
| 3,919,163 A | 11/1975 | Clendinning et al. |
| 3,921,333 A | 11/1975 | Clendinning et al. |
| 3,923,729 A | 12/1975 | Clendinning et al. |
| 3,962,503 A | 6/1976 | Crawford |

(Continued)

FOREIGN PATENT DOCUMENTS

CH 560532 4/1975

(Continued)

*Primary Examiner* — Frank T Palo

(74) *Attorney, Agent, or Firm* — Dunlap Codding, P.C.

(57) ABSTRACT

A preformed decorative wrapper for covering a flower pot has an open upper end, an open lower end, and a sidewall extending therebetween. At least a portion of the preformed decorative wrapper extends beyond an upper end of the pot and at least a portion of a lower end of the flower pot extends through the open lower end of the preformed decorative wrapper.

35 Claims, 10 Drawing Sheets

U.S. PATENT DOCUMENTS

| | | | |
|---|---|---|---|
| 3,973,316 A | 8/1976 | Maher | |
| 4,043,077 A * | 8/1977 | Stonehocker | 47/66.1 |
| 4,104,845 A | 8/1978 | Hoffmann | |
| 4,170,618 A | 10/1979 | Adams | |
| 4,173,108 A | 11/1979 | Eglinton et al. | |
| 4,216,620 A | 8/1980 | Weder et al. | |
| D259,333 S * | 5/1981 | Charbonneau | D9/712 |
| 4,300,312 A | 11/1981 | Weder et al. | |
| 4,333,267 A | 6/1982 | Witte | |
| 4,413,725 A * | 11/1983 | Bruno et al. | 206/770 |
| D279,279 S | 6/1985 | Wagner | |
| 4,733,521 A | 3/1988 | Weder et al. | |
| 4,739,581 A | 4/1988 | Jarvis | |
| 4,773,182 A | 9/1988 | Weder et al. | |
| D298,904 S | 12/1988 | Mourich et al. | |
| 4,795,601 A | 1/1989 | Cheng | |
| 4,835,834 A | 6/1989 | Weder et al. | |
| 4,901,423 A | 2/1990 | Weder et al. | |
| 5,038,933 A | 8/1991 | Weder | |
| 5,073,161 A | 12/1991 | Weder et al. | |
| 5,077,937 A | 1/1992 | Weder et al. | |
| 5,094,060 A | 3/1992 | Caird | |
| 5,105,599 A | 4/1992 | Weder | |
| 5,111,638 A | 5/1992 | Weder | |
| 5,129,182 A | 7/1992 | Weder | |
| 5,161,348 A | 11/1992 | Weder | |
| 5,184,390 A | 2/1993 | Weder | |
| 5,228,234 A | 7/1993 | de Klerk et al. | |
| 5,231,794 A | 8/1993 | Weder et al. | |
| 5,239,775 A | 8/1993 | Landau | |
| 5,274,900 A | 1/1994 | Weder | |
| 5,291,721 A | 3/1994 | Weder et al. | |
| 5,345,745 A | 9/1994 | Weder | |
| 5,363,592 A | 11/1994 | Weder et al. | |
| 5,396,992 A * | 3/1995 | Weder | 206/423 |
| 5,443,670 A | 8/1995 | Landau | |
| 5,459,976 A | 10/1995 | Weder et al. | |
| 5,471,787 A | 12/1995 | Weder et al. | |
| 5,493,810 A | 2/1996 | Weder et al. | |
| 5,515,635 A | 5/1996 | Weder et al. | |
| 5,515,647 A | 5/1996 | Weder et al. | |
| 5,519,967 A | 5/1996 | Weder et al. | |
| 5,524,384 A | 6/1996 | Weder et al. | |
| 5,533,301 A | 7/1996 | Weder et al. | |
| 5,535,548 A | 7/1996 | Weder et al. | |
| 5,535,549 A | 7/1996 | Weder et al. | |
| 5,561,894 A | 10/1996 | Weder et al. | |
| 5,562,798 A | 10/1996 | Weder et al. | |
| 5,609,009 A | 3/1997 | Weder et al. | |
| 5,706,605 A | 1/1998 | Weder et al. | |
| 5,878,883 A | 3/1999 | Weder | |
| 5,987,849 A * | 11/1999 | Weder | 53/397 |
| 6,009,665 A * | 1/2000 | Weder | 47/72 |
| 6,119,860 A * | 9/2000 | Weder | 206/423 |
| 6,240,675 B1 | 6/2001 | Weder et al. | |
| D447,086 S | 8/2001 | Weder | |
| 6,295,791 B1 * | 10/2001 | Weder et al. | 53/397 |
| 6,318,050 B1 * | 11/2001 | Weder | 53/399 |
| 6,324,786 B2 | 12/2001 | Weder et al. | |
| 6,347,480 B1 | 2/2002 | Weder | |
| 6,365,251 B1 | 4/2002 | Weder | |
| D457,099 S | 5/2002 | Lai | |
| 6,403,207 B1 | 6/2002 | Weder | |
| 6,474,020 B2 | 11/2002 | Weder et al. | |
| 6,565,958 B1 | 5/2003 | Weder | |
| 6,618,990 B2 | 9/2003 | Weder et al. | |
| 6,723,417 B2 | 4/2004 | Weder | |
| 6,868,635 B2 | 3/2005 | Weder et al. | |
| 2005/0076566 A1 | 4/2005 | Weder | |
| 2005/0166453 A1 | 8/2005 | Weder | |
| 2005/0268549 A1 | 12/2005 | Weder | |
| 2006/0283083 A1 * | 12/2006 | Weder | 47/84 |
| 2008/0263946 A1 * | 10/2008 | Weder | 47/72 |

FOREIGN PATENT DOCUMENTS

| | | |
|---|---|---|
| DE | 2102789 | 3/1972 |
| FR | 2489126 | 5/1982 |
| GB | 1204647 | 9/1970 |

* cited by examiner

PREFORMED DECORATIVE WRAPPER AND METHODS OF USE THEREOF

CROSS REFERENCE TO RELATED APPLICATIONS

This application is a divisional of U.S. Ser. No. 12/215,797, filed Jun. 30, 2008, now abandoned; which is a continuation of U.S. Ser. No. 11/439,772, filed May 24, 2006, now abandoned; which claims benefit under 35 U.S.C. 119(e) of provisional application U.S. Ser. No. 60/684,023, filed May 24, 2005. The entire contents of each of the above-referenced patents and patent applications are hereby expressly incorporated herein by reference.

FIELD OF THE PRESENTLY DISCLOSED AND CLAIMED INVENTIVE CONCEPT(S)

The presently disclosed and claimed inventive concept(s) relates to floral packaging, and more particularly, but not by way of limitation, to wrappers for covering flower pots.

SUMMARY OF THE PRESENTLY DISCLOSED AND CLAIMED INVENTIVE CONCEPT(S)

Figure 1:
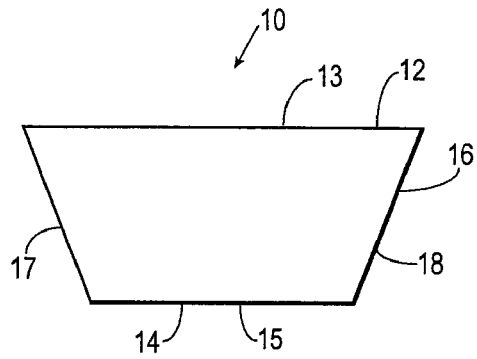
FIG. 1 is an elevational view of a wrapper constructed in accordance with the presently disclosed and claimed inventive concept(s).

The presently disclosed and claimed inventive concept(s) is related to a decorative plant package and methods of assembly thereof. Broadly, the decorative plant package includes a flower pot or other pot or container having an upper end, a lower end, an outer peripheral surface, and an interior space. The pot may have a botanical item or floral grouping disposed therein. The decorative plant package further comprises a preformed decorative wrapper having an open upper end, an open lower end, and a sidewall extending therebetween. The preformed decorative wrapper has flattened and open conditions and is provided with an inner surface surrounding an inner retaining space when disposed in the open condition. The package is constructed by placing the preformed decorative wrapper about the outer peripheral surface of the pot so that at least a portion of the inner surface of the preformed decorative wrapper surrounds and engages a portion of the outer peripheral surface of the pot. At least a portion of the preformed decorative wrapper extends beyond the upper end of the pot and at least a portion of the lower end of the pot extends through the open lower end of the preformed decorative wrapper.

In one embodiment, the open lower end of the preformed decorative wrapper is disposed adjacent an upper one-half of the pot. In another embodiment, the open lower end of the preformed decorative wrapper is disposed adjacent an upper one-third of the pot. In yet another embodiment, the open lower end of the preformed decorative wrapper is disposed adjacent an upper one-fourth of the pot.

In one embodiment, a preformed flexible sleeve having a flattened condition is provided, and the opened flexible sleeve is disposed over at least a portion of the pot and over at least a portion of the preformed decorative wrapper surrounding the pot. The flexible sleeve secures the preformed decorative wrapper about the pot.

In another embodiment of the presently disclosed and claimed inventive concept(s), a securing element serves to hold the preformed decorative wrapper in a position about the pot. The securing element may be disposed upon a portion of at least one of the open upper and lower ends of the preformed decorative wrapper.

In yet another embodiment, a preformed decorative cover, such as but not limited to, an overpot, may be used for securing a portion of the preformed decorative wrapper surrounding the pot once the preformed decorative wrapper has been disposed about the pot.

Alternatively, the preformed decorative wrapper may be disposed into the interior space of the pot, and a portion of the open lower end of the preformed decorative wrapper is secured to the upper end of the inner surface of the pot.

Other objects, features and advantages of the presently disclosed and claimed inventive concept(s) will become apparent from the following detailed description when read in conjunction with the accompanying drawings and appended claims.

DETAILED DESCRIPTION OF THE PRESENTLY DISCLOSED AND CLAIMED INVENTIVE CONCEPT(S)

Before explaining at least one embodiment of the presently disclosed and claimed inventive concept(s) in detail by way of exemplary drawings and description, it is to be understood that the presently disclosed and claimed inventive concept(s) is not limited in its application to the details of construction and the arrangement of the components set forth in the following description or illustrated in the drawings and description. The presently disclosed and claimed inventive concept (s) is capable of other embodiments or of being practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

The presently disclosed and claimed inventive concept(s) is a decorative plant package for decorating and covering flower pots, flower pots having floral groupings (plants) therein, floral vases or bowls, floral groupings comprising cut flowers, floral groupings disposed in a "non-pot" floral holding material such as a form or fiber block, as well as a decorative package for non-pot or non-plant items such as gifts, gift baskets or boxes, Easter baskets, food baskets or boxes such as fruit or candy baskets or boxes, and other boxed or unboxed items. The decorative plant package contemplated herein comprises a preformed decorative wrapper that may be placed on the inside or outside of such container and secured thereto. The preformed decorative wrapper may be secured about the container via a securing element, or by a preformed flexible sleeve or preformed decorative cover disposed about the preformed decorative wrapper disposed about the container.

The terms "flower pot" and "pot", as used herein, refer to containers used for holding floral groupings or potted plants. Examples of such flower pots are clay pots, plastic pots and the like. The flower pot defines a receiving space adapted to receive floral groupings and potted plants. The floral grouping may be disposed within the receiving space of the flower pot along with a suitable growing medium, a floral foam or combinations thereof. It will also be understood that in some cases the floral grouping, and any appropriate growing medium or other retaining medium, may be disposed in a flower pot cover or sleeve without the flower pot if the flower pot cover is adapted to contain the growing medium.

The term "floral grouping" as used herein refers to cut fresh flowers, artificial flowers, a single flower, other fresh and/or artificial plants or other floral materials and may include other secondary plants and/or ornamentation or artificial or natural materials which add to the aesthetics of the overall floral arrangement. The floral grouping may comprise a bloom or foliage portion and a stem portion. However, it will be appreciated that the floral grouping may consist of only a single bloom or only foliage. The term "floral grouping" may be used interchangeably herein with the term "floral arrangement".

The term "preformed" as used herein, refers to an object that has been formed into the condition in which it is used prior to its use. This is in contrast to a sheet of material, which does not have a formed shape in absence of an object. A sheet of material requires that it be formed about an object, whereas a preformed cover or sleeve is provided with seals, folds or the like which provide the cover or sleeve with its preformed shape; optionally, the preformed cover or sleeve may be formed of a material which has shape-sustaining characteristics that maintain the cover or sleeve in its preformed shape in the absence of an object disposed therein.

The terms "polymer film" and "polymeric film", as used herein, refer to polymers of natural or artificial origin, such as a man-made polymer such as a polypropylene or a naturally occurring polymer such as cellophane. A polymer film is relatively strong and will not tear as easily as paper or foil.

The terms "spot" and "spots" as used herein refer to any geometric shape of spot including, but not limited to, what is commonly referred to as strips.

"Securing element" as used herein refers to any type of material or thing which can be used to effect the bonding or connecting of two adjacent portions of material or sheets of material to effect the connection or bonding described herein. "Securing element" may refer to adhesives and cohesives;

ties; labels; elastic bands; non-elastic bands; ribbons; strings; tapes; staples; a piece of wire, tie wrap or twist ties; heat sealable, sonic sealable and vibratory sealable materials; shrinkable materials; barbs, slots, holes, cuts, or other barb-type fastening means or clamps; and combinations of any of the above or any other device capable of gathering the sheet of material to removably or substantially permanently form a crimped portion and secure the crimped portion formed in the sheet of material which may be secured about an object such as the flower pot.

Referring to FIG. 1, a decorative wrapper 10 that is preformed is constructed in accordance with the presently disclosed and claimed inventive concept(s). The decorative wrapper 10 has an upper end 12, a lower end 14, and a sidewall 16 extending therebetween. The decorative wrapper 10 has an opening at the upper end 12 and an opening at the lower end 14. The open upper end 12 and open lower end 14 are provided with linear edges 13 and 15, respectively. Although both the upper edge 13 and the lower edge 15 are shown in FIG. 1 as being linear, it will be understood that the upper and lower edges 13 and 15, respectively, may have any non-linear pattern, such as but not by way of limitation, geometric or non-geometric patterns, for example, curved, scalloped, pointed, sine wave, arced, toothed, angular, crenelate, crenate, crenulate, starred, or the upper and lower edges 13 and 15 may have a combination of a linear and non-linear pattern or an irregular pattern.

The decorative wrapper 10 is initially formed in a flattened condition and is openable therefrom. In one embodiment, the decorative wrapper 10 is formed by using a pair of webs of material such as is described in U.S. Pat. No. 5,562,798, issued to Weder et al., on Oct. 8, 1996, entitled "Apparatus for Forming Sleeves", the contents of which are expressly incorporated herein by reference. In the flattened condition, the decorative wrapper 10 has a first sidewall edge 17 and a second sidewall edge 18. The sidewall edges 17 and 18 may extend angularly away from the lower end 14 at any angle, or any combination of angles. In particular, the sidewall edges 17 and 18 may extend away from the lower end 14 between about 112.5 and about 135. It should also be understood by one of ordinary skill in the art that the sidewall edges 17 and 18 may have a linear or nonlinear pattern.

The decorative wrapper 10 can also be formed employing the method disclosed in U.S. Pat. No. 4,733,521 entitled "Cover Forming Apparatus" issued to Weder et al., on Mar. 29, 1988, which is expressly incorporated herein by reference. Alternatively, the decorative wrapper 10 may be formed by positioning a sheet of material between a female die and a male die as disclosed in U.S. Pat. No. 4,773,182 entitled "Article Forming System" issued to Weder et al., on Sep. 27, 1988, which is also hereby incorporated herein by reference.

The decorative wrapper 10 may be constructed from any suitable substantially flexible material that is capable of being formed into a decorative wrapper 10. For example, the decorative wrapper 10 may be constructed out of paper (untreated or treated in any manner), cellophane, foil, polymer film, fabric (woven, unwoven, synthetic, natural and combinations thereof), a material having an appearance or texture simulating the appearance or texture of cloth, a material having an appearance or texture simulating the appearance or texture of paper, a matted material, and laminations or combinations thereof. Examples of a material having an appearance or texture simulating the appearance or texture of cloth are disclosed in U.S. Pat. Nos. 6,565,958, issued to Weder on May 20, 2003, and 6,723,417, issued to Weder on Apr. 20, 2004; examples of a material having an appearance or texture simulating the appearance of paper are disclosed in U.S. Pat. Nos. 6,403,207, issued to Weder on Jun. 11, 2002, and 6,365,251, issued to Weder on Apr. 2, 2002. Each of the above-referenced patents is hereby expressly incorporated herein by reference. When two or more materials are utilized to construct the decorative wrapper 10, the two or more materials may be fully connected, partially connected, or not connected and simply layered together. When the two or more layers are partially connected, the portion(s) of connection between the two or more layers may be any shape, such as but not limited to, one or more spots and one or more strips. When three or more layers of material are utilized and the three layers are partially connected, the areas of connection between a first and a second layer of material may be the same as, overlap, or be different from, the areas of connection between the second layer and a third layer of material.

The decorative wrapper 10 may assume any shape known in the art or that may be desirable for placing about a flower pot or other container. For example but not by way of limitation, the decorative wrapper 10 may be tubular, non-tubular, conical, non-conical, or frusto-conical shaped.

The decorative wrapper 10 may further include designs or decorative patterns which are printed, textured, colored, coated, finished, etched, and/or embossed, and combinations thereof, on at least a portion thereof. The decorative designs/patterns may be disposed on or visible through at least a portion of the outer surface of the decorative wrapper 10.

In addition, the decorative wrapper 10 may have various colorings, coatings, flockings, and/or metallic finishes, or other decorative surface ornamentation applied separately or simultaneously to at least a portion thereof. Alternatively, the decorative wrapper 10 may be characterized totally or partially by pearlescent, translucent, transparent, iridescent, or the like qualities. Each of the above-named characteristics may occur alone or in combination, and each surface of the decorative wrapper 10 may vary on the combination of such characteristics.

Figure 2:
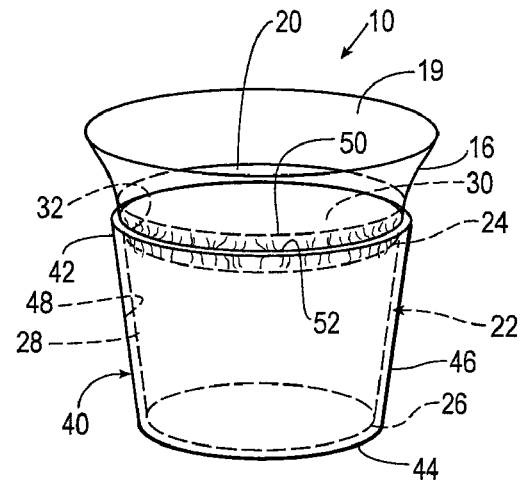
FIG. 2 is a perspective view of the wrapper of FIG. 1 secured to a flower pot with a flexible sleeve.

Referring to FIG. 2, the decorative wrapper 10 is provided with an inner surface 19 surrounding an inner retaining space 20 when disposed in an open condition. A pot 22 is provided having an upper end 24, a lower end 26, and an outer peripheral surface 28. An opening 30 intersects the upper end 24, forming an inner peripheral surface 32. The decorative wrapper 10 is positioned about the outer peripheral surface 28 of the pot 22. At least a portion of the inner surface 19 of the decorative wrapper 10 surrounds and engages a portion of the outer peripheral surface 28 of the pot 22. At least a portion of the decorative wrapper 10 extends beyond the upper end 24 of the pot 22. At least a portion of the lower end 26 of the pot 22 extends through the open lower end 14 of the decorative wrapper 10. The open lower end 14 of the decorative wrapper 10 may be disposed, for example, adjacent the upper one-half, one-third, or one-fourth of the pot 22. The upper edge 13 of the decorative wrapper 10 is positioned a distance above the upper end 24 of the pot 22. The lower edge 15 is positioned a distance below the upper end 24 of the pot 22.

The sidewall 16 of the decorative wrapper 10 may be contoured about the outer peripheral surface 28 of the pot 22 so that a portion of the decorative wrapper 10 is of a smaller diameter than that of the upper end 24 of the flower pot 22. This allows a portion of the decorative wrapper 10 to be tightly disposed about the outer peripheral surface 28 of the pot 22 in such a manner as to secure the decorative wrapper 10 in a position about the pot 22. Thus, the decorative wrapper 10 is positioned above the upper end 24 of the flower pot 22 so as to prevent the decorative wrapper 10 from falling off the flower pot 22.

In another embodiment, the sidewall 16 of the decorative wrapper 10 may also be provided with slits such that the decorative wrapper 10 is disposed over the upper end 24 of the flower pot 22 and inward from the upper end 24 of the flower pot 22, as described in more detail herein below.

As shown in FIG. 2, the decorative wrapper 10 may further be secured to the pot 22 by a preformed flexible sleeve 40. The sleeve 40 is provided having an initially flattened condition such as the sleeve described in U.S. Pat. No. 6,318,050, issued to Weder on Nov. 20, 2001, entitled "Method of Attaching a Sleeve to a Pot", the specification of which is hereby expressly incorporated herein by reference. The sleeve 40 has an upper end 42, a lower end 44, an outer surface 46, an inner surface 48, an inner space 50 and an upper opening 52 at the upper end 42 which is open to the inner space 50. When the sleeve 40 is opened to an opened condition, the opened sleeve 40 is disposed over at least a portion of the pot 22 and over at least a portion of the decorative wrapper 10 surrounding the pot 22. The sleeve 40 crimpingly secures the decorative wrapper 10 about the upper end 24 of the pot 22. It will be understood by one of ordinary skill in the art that the decorative wrapper 10 may be bondingly connected to the outer peripheral surface 28 of the pot 22 with a bonding material. The bonding material may be placed on the outer peripheral surface 28 of the pot 22 or the inner surface 48 of the sleeve 40.

Figure 3:
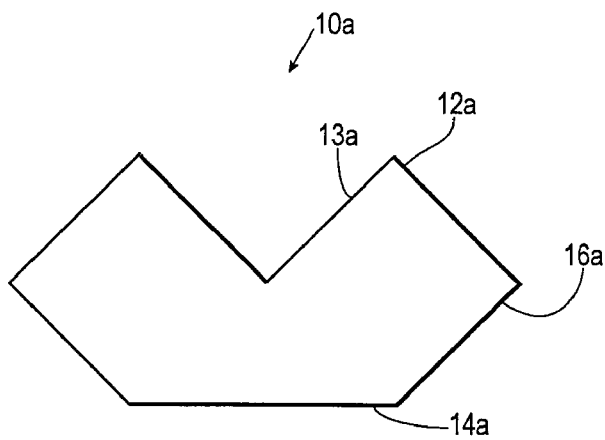
FIG. 3 is an elevational view of another wrapper constructed in accordance with the presently disclosed and claimed inventive concept(s) and having an angularly patterned upper end.

As shown in FIG. 3, another wrapper embodied by the presently disclosed and claimed inventive concept(s) is designated therein by reference numeral 10a. The decorative wrapper 10a has an open upper end 12a, an open lower end 14a, and a sidewall 16a extending therebetween. The decorative wrapper 10a is essentially the same as decorative wrapper 10 except that the upper edge 13a has an angular pattern, and the sidewall 16a is also provided with an angular pattern.

Figure 4:
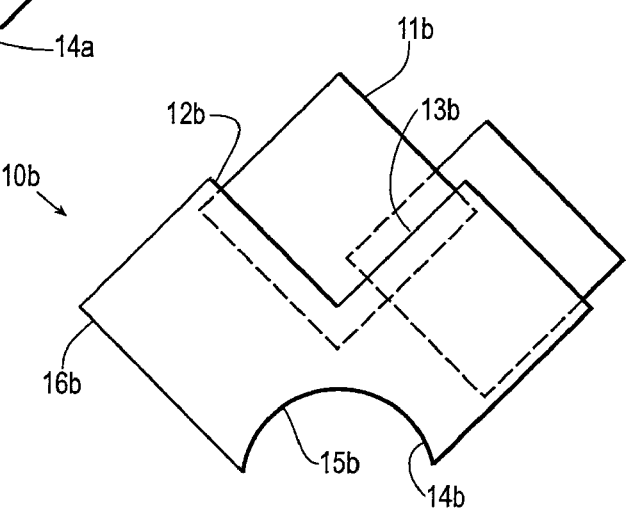
FIG. 4 is an elevational view of another wrapper constructed in accordance with the presently disclosed and claimed inventive concept(s) and having a plurality of extending portions connected to an upper edge thereof and having inwardly curved lower edge.

Referring to FIG. 4, another wrapper embodied by the presently disclosed and claimed inventive concept(s) is designated therein by reference numeral 10b. The decorative wrapper 10b has an open upper end 12b, an open lower end 14b, and a sidewall 16b extending therebetween. The decorative wrapper 10b is similar to the decorative wrapper 10a except that the upper edge 13b has a plurality of inserts or extensions 11b bondingly or otherwise connected to the upper edge 13b, such as with a securing element or bonding material. In addition, the lower end 14b has an inwardly curved lower edge 15b. While the decorative wrapper 10b is illustrated as having a plurality of inserts or extensions 11b, it is to be understood that the decorative wrappers disclosed and claimed herein may only be provided with a single insert/extension, as described in detail herein after with reference to FIG. 12. In addition, the inserts/extensions 11b may be formed from the same or different types of material as the decorative wrapper 10b, and may be provided with the same or different (or none) decorative designs/patterns as the decorative wrapper 10b. Further, the inserts/extensions 11b may be bondingly or otherwise connected to the decorative wrapper 10b by any method disclosed herein or known in the art, including but not limited to, the securing elements disclosed herein. Examples of inserts/extensions that may be utilized in accordance with the presently disclosed and claimed inventive concept(s) are disclosed in U.S. Patent Application Publication Numbers U.S. 2005/0268549 A1, published Dec. 8, 2005; U.S. 2005/0166453 A1, published Aug. 4, 2005; and U.S. 2005/0076566 A1, published Apr. 14, 2005; the contents of each of which are hereby expressly incorporated herein by reference.

Figure 5:
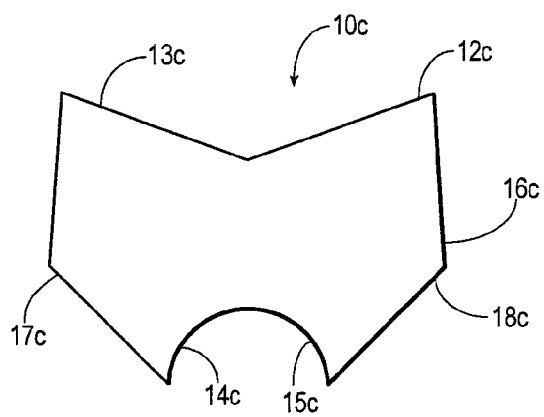
FIG. 5 is an elevational view of another wrapper constructed in accordance with the presently disclosed and claimed inventive concept(s), the wrapper having tapered sides, a non-linear upper edge and an inwardly curved lower edge.

Referring to FIG. 5, another wrapper embodied by the presently disclosed and claimed inventive concept(s) is designated therein by reference numeral 10c. The decorative wrapper 10c has an open upper end 12c, an open lower end 14c, and a sidewall 16c extending therebetween. The decorative wrapper 10c is similar to the decorative wrapper 10a except that the upper edge 13c is nonlinear and the lower end 14c has an inwardly curved lower edge 15c. In addition, the sidewall 16c has angular tapered sidewall edges 17c and 18c.

Figure 6:
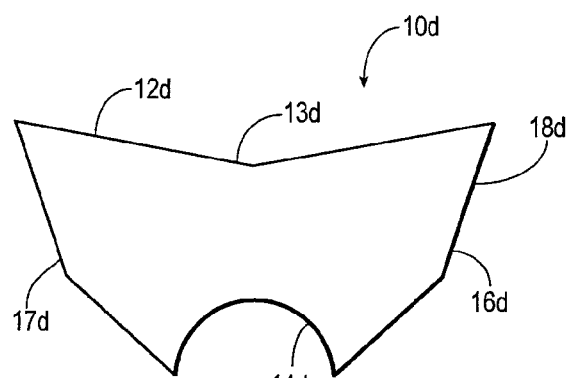
FIG. 6 is an elevational view of another wrapper constructed in accordance with the presently disclosed and claimed inventive concept(s), the wrapper having a non-linear upper edge and an inwardly curved lower edge.

Referring to FIG. 6, another wrapper embodied by the presently disclosed and claimed inventive concept(s) is designated therein by reference numeral 10d. The decorative wrapper 10d has an open upper end 12d, an open lower end 14d, and a sidewall 16d extending therebetween. The decorative wrapper 10d is similar to the decorative wrapper 10c except that a different configuration for the sidewall edges 17d and 18d are shown.

Figure 7:
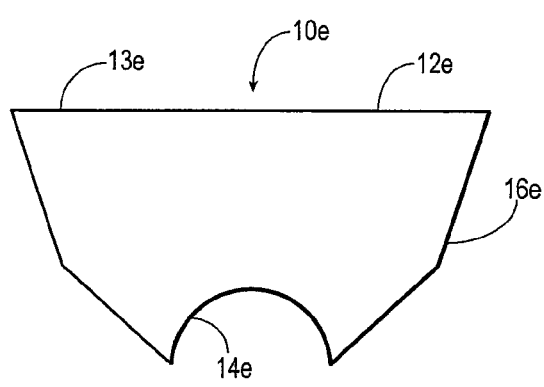
FIG. 7 is an elevational view of another wrapper constructed in accordance with the presently disclosed and claimed inventive concept(s), the wrapper having a linear upper edge an inwardly curved lower edge.

As shown in FIG. 7, another wrapper embodied by the presently disclosed and claimed inventive concept(s) is designated therein by reference numeral 10e. The decorative wrapper 10e has an open upper end 12e, an open lower end 14e, and a sidewall 16e extending therebetween. The decorative wrapper 10e is similar to the decorative wrapper 10d except that the decorative wrapper 10e has an upper edge 13e that is linear.

Figure 8:
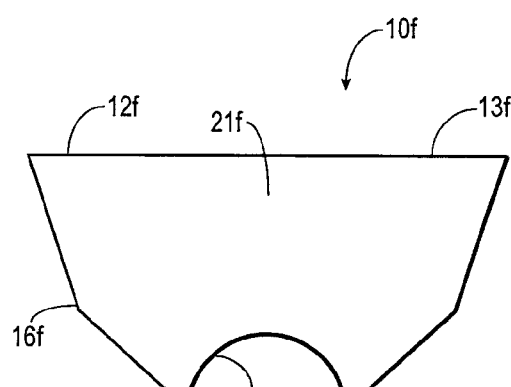
FIG. 8 is an elevational view of another wrapper constructed in accordance with the presently disclosed and claimed inventive concept(s), the wrapper having a linear upper edge having centrally disposed slits along the upper edge and further having an inwardly curved lower edge.

Referring to FIG. 8, another wrapper embodied by the presently disclosed and claimed inventive concept(s) is designated therein by reference numeral 10f. The decorative wrapper 10f has an open upper end 12f, an open lower end 14f, and a sidewall 16f extending therebetween. The decorative wrapper 10f is similar to the decorative wrapper 10f except that the decorative wrapper 10f has at least one slit 21f disposed along the upper end 12f and extending into a portion of the preformed decorative wrapper 10f. While the slit(s) 12f are illustrated as being disposed along the upper end 12f of the decorative wrapper 10f, it is to be understood that the slit(s) 12f may be disposed along the upper end 12f, the lower end 14f and/or the sidewall 16f. In addition, while the slit(s) 21f are illustrated as being centrally disposed in FIG. 8, it is to be understood that the slit(s) 21f may be disposed along any portion of the upper end 12f, the lower end 14f and/or the sidewall 16f of the decorative wrapper 10f.

Figure 9:
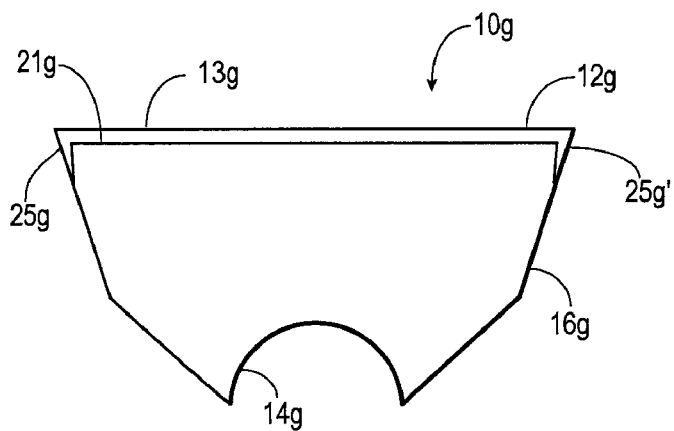
FIG. 9 is an elevational view of another wrapper constructed in accordance with the presently disclosed and claimed inventive concept(s), the wrapper having a linear upper edge having centrally disposed slits positioned on opposite ends.

For example but not by way of limitation, another wrapper embodied by the presently disclosed and claimed inventive concept(s) is shown in FIG. 9 and designated therein by reference numeral 10g. The decorative wrapper 10g has an open upper end 12g, an open lower end 14g, and a sidewall 16g extending therebetween. The decorative wrapper 10g is similar to the decorative wrapper 10f except that the decorative wrapper 10f has at least one centrally disposed slit 21g positioned on opposite ends 25g and 25g' of the sidewall 16g and extending therefrom.

Figure 10:
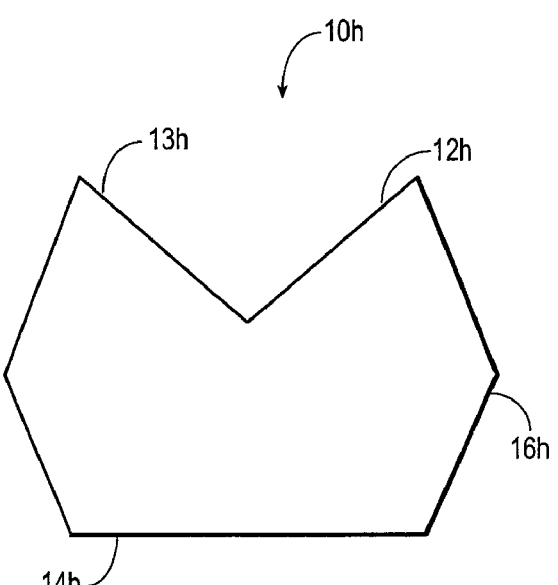
FIG. 10 is an elevational view of another wrapper constructed in accordance with the presently disclosed and claimed inventive concept(s) and having a pointed upper edge.

Referring now to FIG. 10, another wrapper embodied by the presently disclosed and claimed inventive concept(s) is designated therein by reference numeral 10h. The decorative wrapper 10h has an open upper end 12h, an open lower end 14h, and a sidewall 16h extending therebetween. The decorative wrapper 10h is similar to the decorative wrapper 10a except that another configuration for an upper edge 13h is illustrated.

Figure 11:
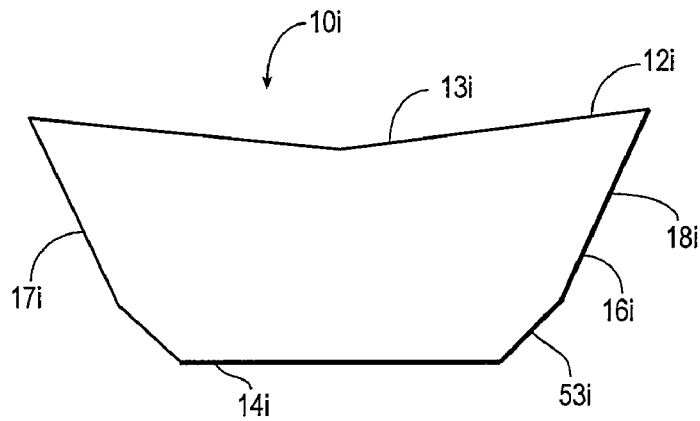
FIG. 11 is an elevational view of another wrapper constructed in accordance with the presently disclosed and claimed inventive concept(s), the wrapper having sides that angle outwardly from a lower end.

Referring to FIG. 11, another wrapper embodied by the presently disclosed and claimed inventive concept(s) is designated therein by reference numeral 10i. The decorative wrapper 10i has an open upper end 12i, an open lower end 14i, and a sidewall 16i extending therebetween. The sidewall edges 17i and 18i angle outwardly from the lower end 14i, and a lower portion 53i of the decorative wrapper 10i is provided with a half-hexagonal shape.

Figure 12:
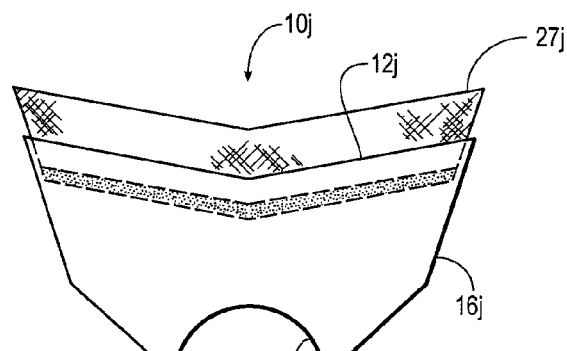
FIG. 12 is an elevational view of another wrapper constructed in accordance with the presently disclosed and claimed inventive concept(s), the wrapper having a decorative extension attached thereto.

Referring to FIG. 12, another wrapper embodied by the presently disclosed and claimed inventive concept(s) is designated therein by reference numeral 10j. The decorative wrapper 10j has an open upper end 12j, an open lower end 14j, and a sidewall 16j extending therebetween. The decorative wrapper 10j is similar to the decorative wrappers 10b and 10d except that at least one decorative extension 27j is bondingly connected to a portion of the upper end 12j of the decorative wrapper 10j with a bonding material. The decorative extension 27j is similar to the extensions 11b described herein previously with reference to FIG. 4.

Figure 13:
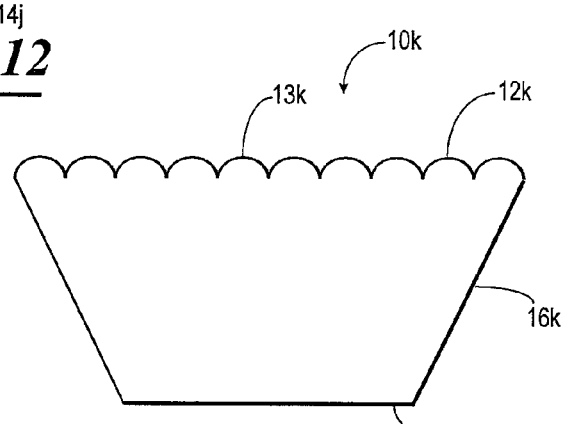
FIG. 13 is an elevational view of another wrapper constructed in accordance with the presently disclosed and claimed inventive concept(s) and having a scalloped upper edge.

Referring to FIG. 13, another wrapper embodied by the presently disclosed and claimed inventive concept(s) is designated therein by reference numeral 10k. The decorative wrapper 10k has an open upper end 12k, an open lower end 14k, and a sidewall 16k extending therebetween. The decorative wrapper 10k is similar to the decorative wrapper 10 except that the decorative wrapper 10k has an upper edge 13k that has a decorative scalloped pattern.

Figure 14:
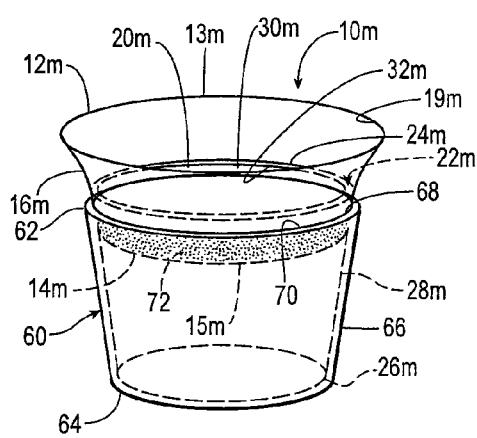
FIG. 14 is a perspective view of a wrapper secured to a flower pot with a decorative cover or second pot and a bonding material.

Shown in FIG. 14 is a decorative plant package comprising a decorative wrapper 10m illustrated in the open condition. The decorative wrapper 10m may have any of the configurations of the decorative wrappers 10-10k shown in FIGS. 1 and 3-13 and described herein above. The decorative wrapper 10m has an open upper end 12m, an open lower end 14m, and a sidewall 16m extending therebetween. The open upper end 12m and open lower end 14m are shown having linear edges 13m and 15m, respectively. The opened decorative wrapper 10m is provided with an inner surface 19m surrounding an inner retaining space 20m. The decorative plant package further comprises a pot 22m, which has an upper end 24m, a lower end 26m, and an outer peripheral surface 28m. An opening 30m intersects the upper end 24m of the pot 22m, forming an inner peripheral surface 32m. The decorative wrapper 10m is positioned about the outer peripheral surface 28m substantially adjacent the upper end 24m of the pot 22m. At least a portion of the inner surface 19m of the decorative wrapper 10m surrounds and engages a portion of the outer peripheral surface 28m of the pot 22m. At least a portion of the decorative wrapper 10m extends beyond the upper end 24m of the pot 22m, and the lower end 26m of the pot 22m extends through the open lower end 14m of the decorative wrapper 10m.

The decorative plant package further comprises a second pot or preformed decorative cover 60, which has an upper end 62, a lower end 64, and an outer peripheral surface 66. An opening 68 intersects the upper end 62, forming an inner peripheral surface 70. The second pot/preformed decorative cover 60 is positioned over at least a portion of the pot 22m and over at least a portion of the decorative wrapper 10m. At least a portion of the second pot/preformed decorative cover 60 surrounds the lower end 14m of the decorative wrapper 10m. The second pot/preformed decorative cover 60 may be formed of a flexible or rigid, shape-sustaining material. In one embodiment, the second pot/preformed decorative cover 60 may be an overpot.

FIG. 14 depicts the second pot/preformed decorative cover 60 as having a securing element 72, such as a bonding material, disposed on at least a portion of the inner peripheral surface 70 thereof. More particularly, the securing element 72 is depicted as being disposed on the inner peripheral surface 70 of the second pot/preformed decorative cover 60 near the upper end 62 thereof. The second pot/preformed decorative cover 60 secures the decorative wrapper 10m about the pot 22m. While FIG. 14 depicts the second pot/preformed decorative cover 60 as having a securing element 72 disposed thereon, it is to be understood that the securing element 72 may be disposed on the decorative wrapper 10m, or the pot 22m, or any combination of the decorative wrapper 10m, the pot 22m and the second pot/preformed decorative cover 60. In addition, no securing element may be utilized, and the second pot/preformed decorative cover 60 may simply maintain the decorative wrapper 10m in a secured position about the pot 22m.

Figure 15:
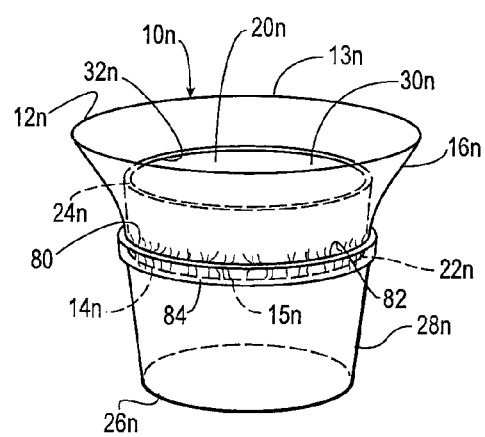
FIG. 15 is a perspective view of a wrapper secured to a flower pot with a band.

Alternatively, the preformed decorative wrappers of the presently disclosed and claimed inventive concept(s) may be held in place about a pot without the use of a sleeve, second pot or preformed decorative cover. FIG. 15 illustrates a decorative plant package comprising a decorative wrapper 10n that is in the open condition and secured to a flower pot 22n with a securing element 80, such as a band. The securing element 80 can be applied manually or automatically such as by the method shown in U.S. Pat. No. 5,105,599, entitled "Means for Securing a Decorative Cover About a Flower Pot", issued to Weder on Apr. 21, 1983, which is hereby expressly incorporated herein by reference. The securing element 80 can also be applied as a tie using a method such as described in "Single Station Covering and Fastening System", U.S. Pat. No. 5,609,009, issued to Weder et al. on Mar. 11, 1997, the specification of which is hereby expressly incorporated herein by reference.

Any of the decorative wrappers described herein can also be applied automatically about the flower pot 22n, for example, by methods shown in U.S. Pat. No. 4,733,521 entitled "Cover Forming Apparatus", issued to Weder et al. on Mar. 29, 1988, and U.S. Pat. No. 5,291,721, entitled "Cover Forming Apparatus Having Voting Forming Members", issued to Weder et al. on Mar. 8, 1994, both of which are hereby expressly incorporated herein by reference.

The decorative wrapper 10n may have any of the configurations of wrappers 10-10k shown in FIGS. 1 and 3-13 and described herein above. The decorative wrapper 10n has an open upper end 12n, an open lower end 14n, and a sidewall 16n extending therebetween. The open upper end 12n and open lower end 14n are illustrated in FIG. 15 as having linear edges 13n and 15n, respectively. The opened decorative wrapper 10n is provided with an inner surface 19n surrounding an inner retaining space 20n. A pot 22n is provided having an upper end 24n, a lower end 26n, and an outer peripheral surface 28n. An opening 30n intersects the upper end 24n, forming an inner peripheral surface 32n. The decorative wrapper 10n is positioned about the outer peripheral surface 28n of the upper end 24n of the pot 22n. At least a portion of the inner surface 19n of the decorative wrapper 10n surrounds and engages a portion of the outer peripheral surface 28n of the pot 22n. At least a portion of the decorative wrapper 10n extends beyond the upper end 24n of the pot 22n and at least a portion of the lower end 26n of the pot 22n extends through the open lower end 14n of the decorative wrapper 10n.

The securing element 80 preferably is constructed of any material capable of being wrapped about a portion of the decorative wrapper 10n in the manner described herein. Preferably the securing element 80 is constructed of a material selected from a group of materials consisting of elastic, non-elastic, rubber, paper, metal foil, cloth (natural or synthetic), denim, burlap, polymer film or cling material or combinations thereof. The securing element 80 has an upper surface 82 and a lower surface 84. A securing element 80 may further include a bonding material disposed on at least a portion thereof, such as the upper surface 82, or the securing element 80 may be free of bonding material.

With the opened decorative wrapper 10n positioned about the outer peripheral surface 28n of the flower pot 22n, the securing element 80 is applied over a portion of the decorative wrapper 10n, such as but not limited to, a portion near or adjacent to the open lower end 14n of the decorative wrapper 10*n*. The securing element 80 surrounds a portion of the decorative wrapper 10*n* and secures the decorative wrapper 10*n* about the pot 22*n*, thereby forming a crimped portion 86 in the decorative wrapper 10*n*. Preferably, the securing element 80 is placed about the decorative wrapper 10 in a position where the crimped portion 86 is formed and positioned below the upper end 24*n* of the flower pot 22*n* with the crimped portion 86 extending circumferentially about the upper end 24*n* of the flower pot 22*n*.

Figure 16:
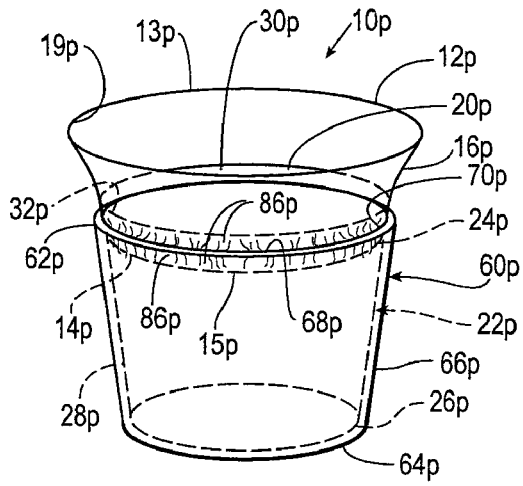
FIG. 16 is a perspective view of a wrapper secured to a flower pot with a decorative cover or a second pot.

Shown in FIG. 16 is a perspective view of a decorative plant package comprising a decorative wrapper 10*p* secured to a flower pot 22*p* with a second pot or preformed decorative cover 60*p*. The decorative wrapper 10*p* may have any of the configurations of wrappers 10-10*k* shown in FIGS. 1 and 3-13 and described herein above. The decorative wrapper 10*p* has an open upper end 12*p* having an upper edge 13*p*, an open lower end 14*p* having a lower edge 15*p*, and a sidewall 16*p* extending therebetween. The opened decorative wrapper 10*p* is provided with an inner surface 19*p* surrounding an inner retaining space 20*p*. The pot 22*p* is provided having an upper end 24*p*, a lower end 26*p*, and an outer peripheral surface 28*p*. An opening 30*p* intersects the upper end 24*p*, forming an inner peripheral surface 32*p*. The decorative wrapper 10*p* is positioned about the outer peripheral surface 28*p* of the upper end 24*p* of the pot 22*p*. At least a portion of the inner surface 19*p* of the decorative wrapper 10*p* surrounds and engages a portion of the outer peripheral surface 28*p* of the pot 22*p*. At least a portion of the decorative wrapper 10*p* extends beyond the upper end 24*p* of the pot 22*p* and at least a portion of the lower end 26*p* of the pot 22*p* extends through the open lower end 14*p* of the decorative wrapper 10*p*.

The second pot/preformed decorative cover 60*p* is provided having an upper end 62*p*, a lower end 64*p*, and an outer peripheral surface 66*p*. An opening 68*p* intersects the upper end 62*p*, forming an inner peripheral surface 70*p*. The second pot/preformed decorative cover 60*p* is positioned over at least a portion of the pot 22*p* and over at least a portion of the decorative wrapper 10*p*. At least a portion of the second pot/preformed decorative cover 60*p* surrounds the lower end 14*p* of the decorative wrapper 10*p*. The second pot/preformed decorative cover 60*p* surrounds the open lower end 14*p* of the decorative wrapper 10*p*, thereby securing the decorative wrapper 10*p* about the pot 22*p* and forming a crimped portion 86*p*. The crimped portion 86*p* extends circumferentially about a portion of the flower pot 22*p*. The second pot/preformed decorative cover 60*p* secures the decorative wrapper 10*p* about the pot 22*p*.

Figure 17:
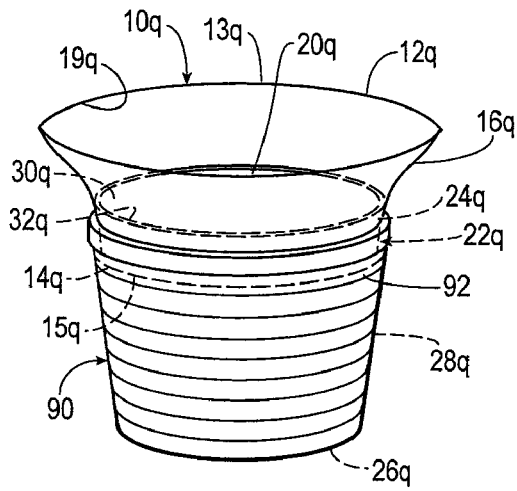
FIG. 17 is a perspective view of a wrapper secured to a flower pot with a wrapping material.

Referring now to FIG. 17, a decorative plant package is illustrated. The decorative plant package comprises an opened decorative wrapper 10*q* secured to a flower pot 22*q* with a wrapping material 90 such as described in U.S. Pat. No. 5,345,745, issued to Weder on Sep. 13, 1994, the specification of which is hereby expressly incorporated herein by reference. The decorative wrapper 10*q* may have any of the configurations of wrappers 10-10*k* shown in FIGS. 1 and 3-13 and described herein above. The decorative wrapper 10*q* has an open upper end 12*q* having an upper edge 13*q*, an open lower end 14*q* having a lower end 15*q*, and a sidewall 16*q* extending therebetween. The opened decorative wrapper 10*q* is provided with an inner surface 19*q* surrounding an inner retaining space 20*q*. The pot 22*q* is provided having an upper end 24*q*, a lower end 26*q*, and an outer peripheral surface 28*q*. An opening 30*q* intersects the upper end 24*q*, forming an inner peripheral surface 32*q*. The decorative wrapper 10*q* is positioned about the outer peripheral surface 28*q* of the pot 22*q*. At least a portion of the inner surface 19*q* of the decorative wrapper 10*q* surrounds and engages a portion of the outer peripheral surface 28*q* of the pot 22*q*. At least a portion of the decorative wrapper 10*q* extends beyond the upper end 24*q* of the pot 22*q* and at least a portion of the lower end 26*q* of the pot 22*q* extends through the open lower end 14*q* of the decorative wrapper 10*q*.

The wrapping material 90 has an upper surface 92 and a lower surface (not shown). The wrapping material may be provided with a bonding material on a portion of the lower surface of the wrapping material 90. After positioning the decorative wrapper 10*q* about the flower pot 22*q*, the wrapping material 90 is wrapped about at least a portion of the outer peripheral surface 28*q* of the flower pot 22*q* and a portion of the decorative wrapper 10*q*. The wrapping material 90 is connected to the outer peripheral surface 28*q* of the flower pot 22*q*. A portion of the wrapping material 90 extends over the decorative wrapper 10*q* thus securing the decorative wrapper 10*q* to the flower pot 22*q*.

Figure 18:
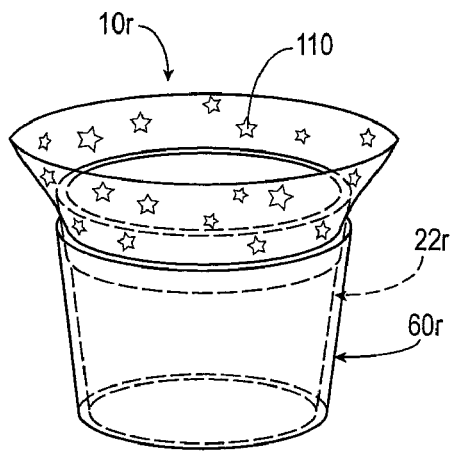
FIG. 18 is a perspective view of a wrapper having a decorative printed pattern disposed thereon, the wrapper secured to a flower pot with a decorative cover or second pot.

FIG. 18 depicts a decorative plant package that includes an opened decorative wrapper 10*r* secured to a flower pot 22*r* with a second pot/preformed decorative cover 60*r* in a similar manner as shown in FIG. 14, except that the opened decorative wrapper 10*r* includes a decorative pattern 110 printed thereon or visible therethrough such as described in U.S. Pat. No. 6,347,480, issued to Weder on Feb. 19, 2002, the specification of which is hereby expressly incorporated herein by reference.

Figure 19:
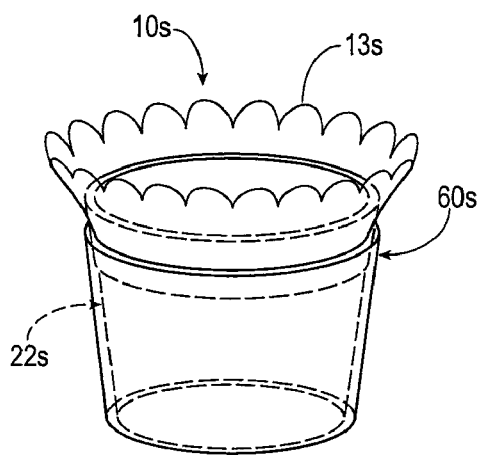
FIG. 19 is a perspective view of a wrapper having a scalloped upper edge, the wrapper secured to a flower pot with a decorative cover or a second pot.

Referring to FIG. 19, an opened decorative wrapper 10*s* is secured to a flower pot 22*s* with a second pot/preformed decorative cover 60*s* in a similar manner as shown in FIG. 18, except that the opened decorative wrapper 10*s* has an upper edge 13*s* that has a decorative scalloped pattern.

Figure 20:
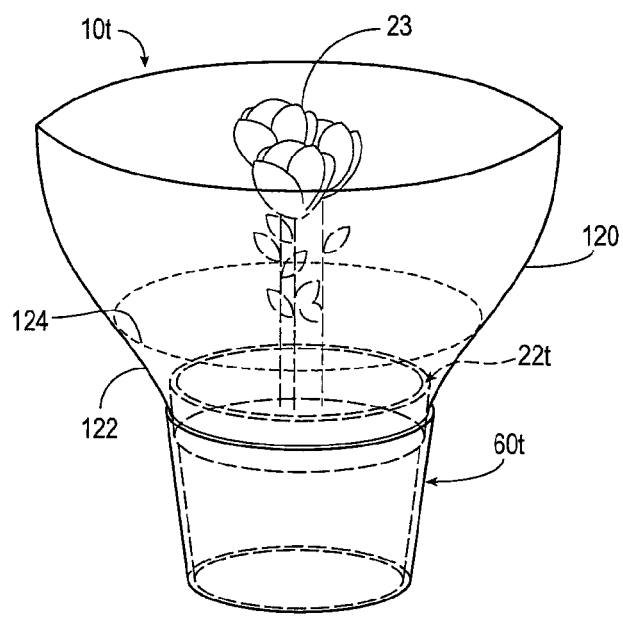
FIG. 20 is a perspective view of a wrapper having a detachable upper portion and disposed about a flower pot having a floral grouping disposed therein, the wrapper secured about the flower pot with a decorative cover or a second pot.

FIG. 20 illustrates a decorative plant package comprising an opened decorative wrapper 10*t*, a flower pot 22*t* and a second pot/preformed decorative cover 60*t*. The decorative wrapper 10*t* is secured to the flower pot 22*t* with the second pot/preformed decorative cover 60*t* in a similar manner as shown in FIG. 14. The flower pot 22*t* is provided with a floral grouping 23 disposed therein. The decorative wrapper 10*t* is demarcated into an upper portion 120 and a lower portion 122. The upper portion 120 may function to protect the floral grouping 23, and thus the upper portion 120 of the decorative wrapper 10*t* may be sized to substantially surround and encompass the floral grouping 23*t* disposed in the pot 22*t*. The upper portion 120 of the decorative wrapper 10*t* may be tapered or may assume any desired shape disclosed herein or known in the art.

The decorative wrapper 10 is demarcated into the upper portion 120 and the lower portion 122 by a detaching element 124, which enables the detachment of the upper portion 120 of the decorative wrapper 10*t* from the lower portion 122 of the decorative wrapper 10*t*. The term "detaching element", as used generally herein, means any element or combination of elements or features which enable the tearing away or detachment of one object from another, such as, but not by way of limitation, perforations, tear strips, zippers, and any other devices or elements of this nature known in the art, or any combination thereof. Therefore, while perforations are shown and described in detail herein, it will be understood that tear strips, zippers, or any other "detaching elements" known in the art, or any combination thereof, could be substituted therefore and/or used therewith.

In addition, while the detaching element 124 is depicted as being linear, it is to be understood that the detaching element 124 may assume any configuration described or depicted herein or known in the art.

While the decorative wrapper 10*t* is depicted as being secured to the pot 22*t* via the second pot/preformed decorative cover 60t, it is to be understood that the decorative wrapper 10t may be secured to the pot 22t by any securing method and/or securing element described or depicted herein or known in the art.

Figure 21:
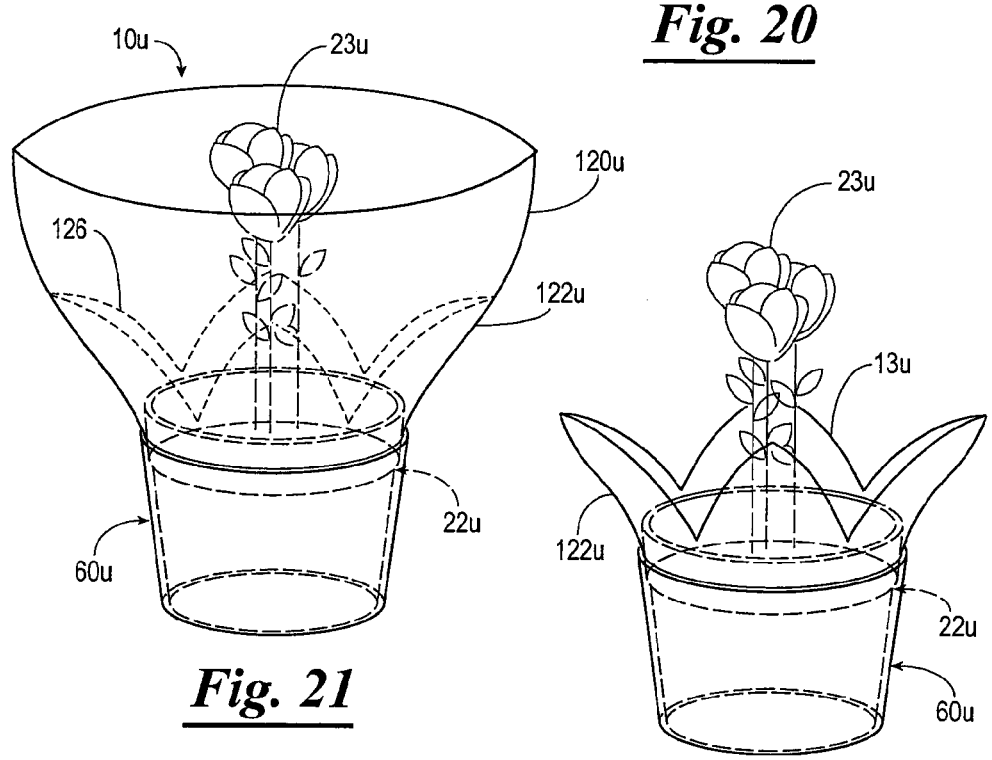
FIG. 21 is a perspective view of a wrapper having a detachable upper portion and disposed about a flower pot having a floral grouping disposed therein, the wrapper secured about the flower pot with a decorative cover or a second pot.
Figure 22:
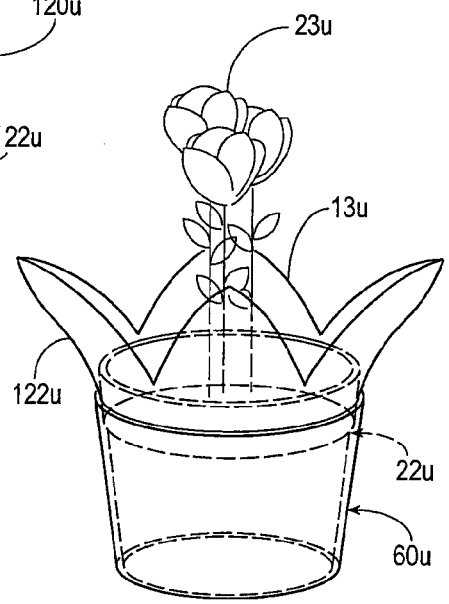
FIG. 22 is a perspective view of the wrapper of FIG. 21 with the upper portion of the wrapper removed.

Referring to FIGS. 21 and 22, a decorative wrapper 10u is shown secured to a flower pot 22u with a second pot/preformed decorative cover 60u. The flower pot 22u has a floral grouping 23u disposed therein. The decorative wrapper 10u may have any of the configurations of wrappers 10-10k shown in FIGS. 1 and 3-13 and described herein above. The decorative wrapper 10u is demarcated into an upper portion 120u and a lower portion 122u by a detaching element 126. The detaching element 126 is illustrated as being a nonlinear patterned perforation. As shown in FIG. 22, the upper portion 122u is detached from the lower potion 122u such that the lower portion 122u is provided with an upper edge 13u that has a nonlinear pattern.

Figure 23:
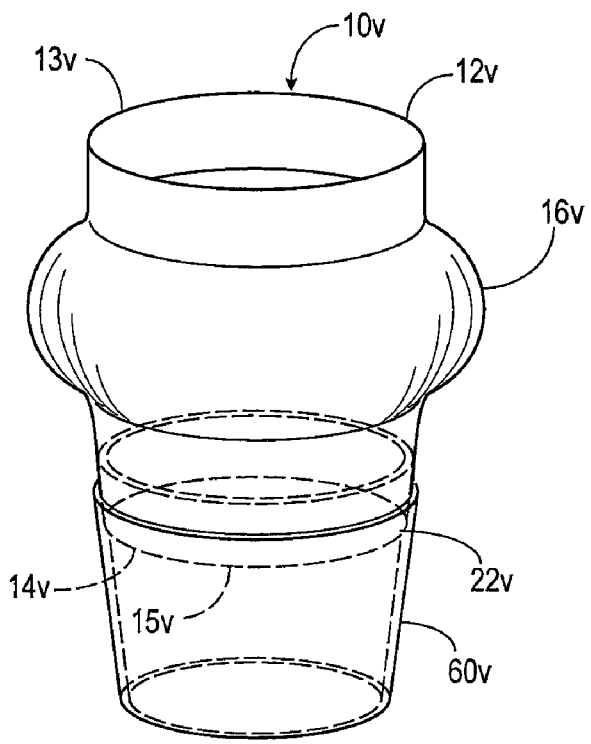
FIG. 23 is a perspective view of a wrapper having a non-tubular, non-conical shape, the wrapper secured about a flower pot with a decorative cover or a second pot.

Shown in FIG. 23 is a decorative plant package comprising an opened decorative wrapper 10v secured to a flower pot 22v with a second pot/preformed decorative cover 60v in a manner similar to that described herein previously. The decorative wrapper 10v has an open upper end 12v, an open lower end 14v, and a sidewall 16v extending therebetween. The open upper end 12v and open lower end 14v are shown having linear edges 13v and 15v, respectively. However, it should be understood that the upper edge 13v and the lower edge 15v may have a nonlinear pattern. The sidewall 16v is nonlinear such that the opened decorative wrapper 10v has a non-tubular, non-conical shape.

Figure 24:
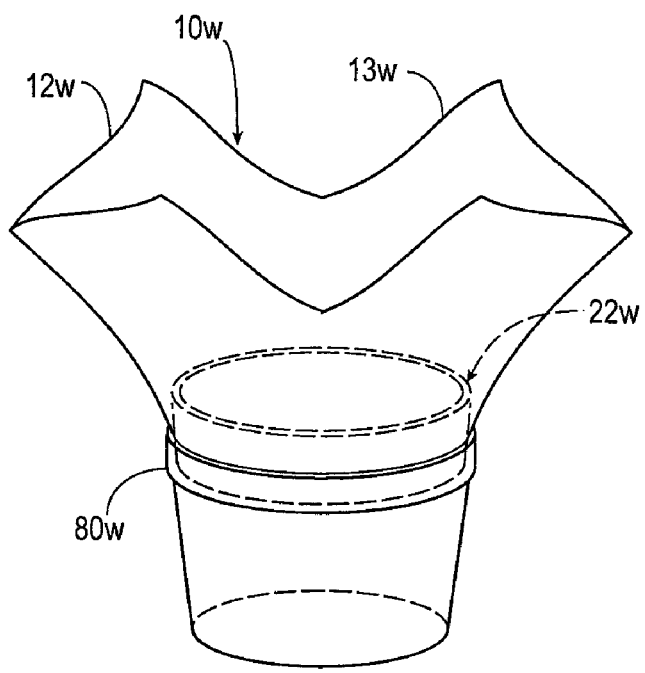
FIG. 24 is a perspective view of a wrapper having an angularly patterned upper end, the wrapper secured to a flower pot with a band.

Shown in FIG. 24 is a decorative plant package comprising an opened decorative wrapper 10w secured to a flower pot 22w with a securing element 80w in a similar manner as shown in FIG. 15. The decorative wrapper 10w is depicted as having an upper edge 13w that is angularly patterned.

Figure 25:
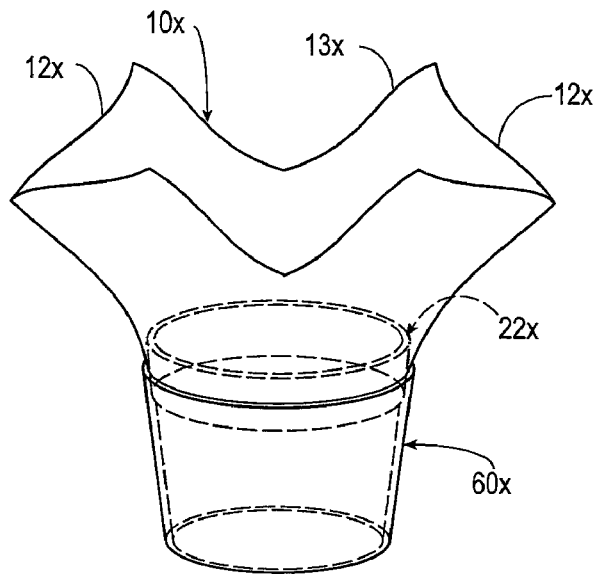
FIG. 25 is a perspective view of a wrapper having an angularly patterned upper end, the wrapper secured to a flower pot with a decorative cover or a second pot.

Shown in FIG. 25 is a decorative plant package comprising an opened decorative wrapper 10x secured to a flower pot 22x with a second pot/preformed decorative cover 60x in a similar manner as shown in FIG. 14. The decorative wrapper 10x is depicted as having an angularly patterned upper edge 13x.

Figure 26:
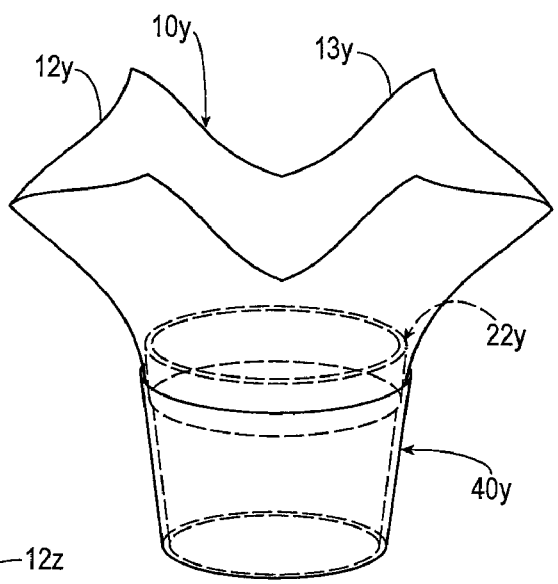
FIG. 26 is a perspective view of a wrapper having an angularly patterned upper end, the wrapper secured to a flower pot with a flexible sleeve.

Referring to FIG. 26, a decorative plant package shown therein comprises an opened decorative wrapper 10y secured to a flower pot 22y with a flexible sleeve 40y in a similar manner as shown in FIG. 2. The decorative wrapper 10y is depicted as having an angularly patterned upper edge 13y.

Figure 27:
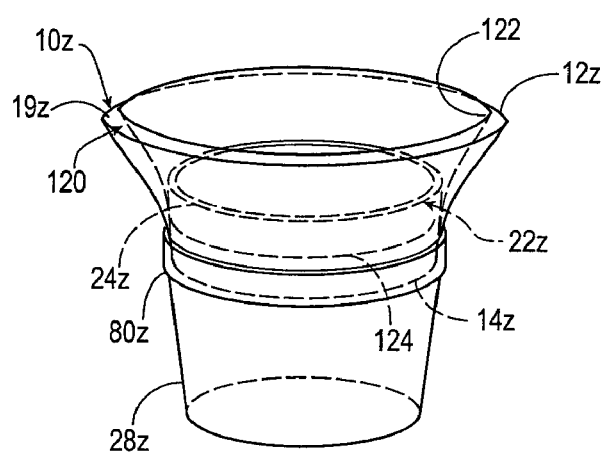
FIG. 27 is a perspective view of a wrapper having an extension, the wrapper secured to a flower pot with a band.

Referring to FIG. 27, shown therein is a decorative plant package comprising an opened decorative wrapper 10z secured to a flower pot 22z with a securing element 80z. The decorative wrapper 10z has an upper end 12z, a lower end 14z, and an inner surface 19z. The decorative wrapper 10z is provided with an extension 120 attached thereto. The extension 120 is preferably laminated to the decorative wrapper 10z via a heat seal or an adhesive seal, but it will be understood that the extension 120 can be attached to the decorative wrapper 10z via any attaching, connecting, or lamination method known to one of ordinary skill in the art. The extension 120 has an upper end 122 and a lower end 124. The upper end 122 of the extension 120 may be positioned above, below, or substantially adjacent with the upper end 12z of the decorative wrapper 10z.

In addition, while the lower end 124 of the extension 120 is depicted as being above the lower end 14z of the decorative wrapper 10z, it is to be understood that the lower ends 14z and 124 may be substantially adjacent. Also, it is to be understood that while FIG. 27 has been described herein as illustrating a wrapper with an extension, it is to be understood that such figure will also be understood to similarly depict a decorative plant package that comprises two wrappers that may be attached or unattached. In one embodiment, an upper and/or lower end of one of the two wrappers may extend beyond the other (as similarly shown in FIG. 27); alternatively, the upper ends of the two wrappers may be substantially adjacent or flush and the lower ends of the two wrappers may also be substantially adjacent/flush.

Figure 28:
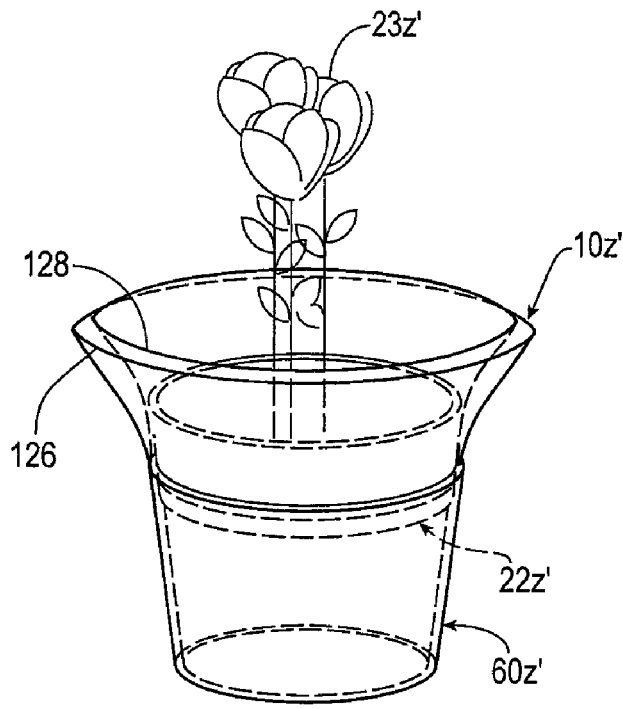
FIG. 28 is a perspective view of a wrapper having an extension, the wrapper secured to a flower pot containing a floral grouping with a decorative cover or a second pot.

FIG. 28 depicts a decorative plant package comprising a wrapper 10z' formed of two layers of material 126 and 128. The preformed decorative wrapper 10z' is secured to a flower pot 22z' containing a floral grouping 23z' with a second pot/preformed decorative cover 60z' as described herein previously.

Figure 29:
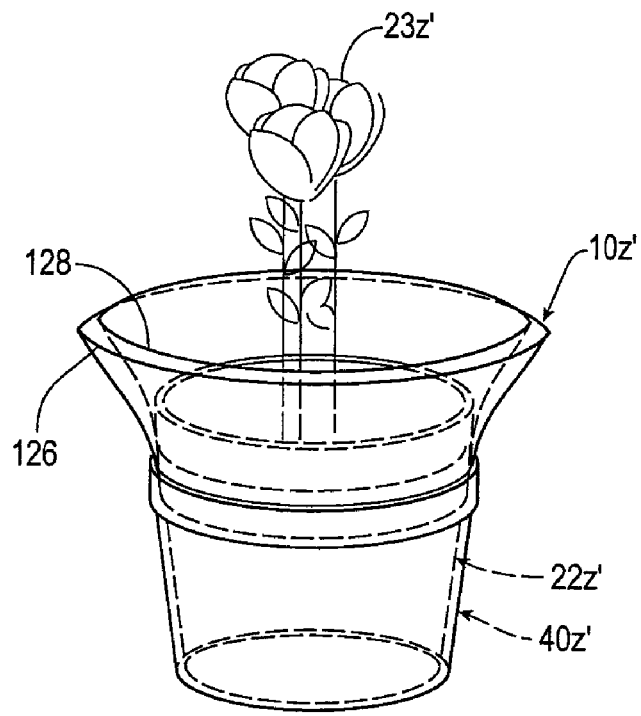
FIG. 29 is a perspective view of a wrapper having an extension, the wrapper secured to a flower pot containing a floral grouping with a flexible sleeve.

FIG. 29 depicts a decorative plant package comprising the decorative wrapper 10z' formed of the two layers 126 and 128 and secured to the flower pot 22z' containing a floral grouping 23z' with a flexible sleeve 40z' as described herein previously.

Figure 30:
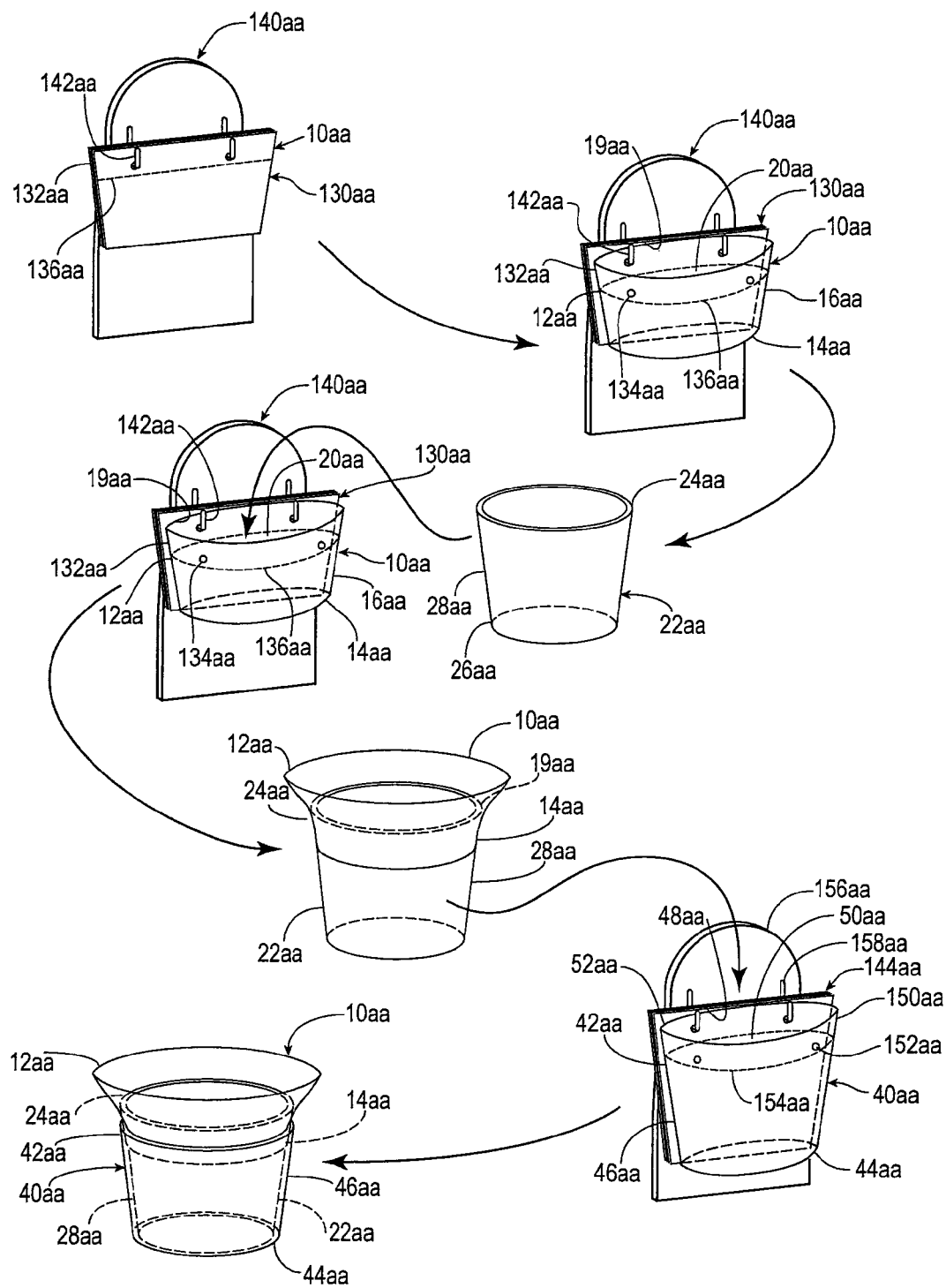
FIG. 30 contains perspective views of a method of wrapping a flower pot with a wrapper, wherein the wrapper is removed from a plurality of wrappers formed in a pad and then disposed and secured about a flower pot.

FIG. 30 depicts a method of forming decorative plant packages of the presently disclosed and claimed inventive concept (s), the method utilizing a plurality of wrappers 10aa. The plurality of wrappers 10aa are stacked one on top of the other to form a pad 130aa. However, it should be understood that the plurality of wrappers 10aa may also take the form of a roll, as is shown in U.S. Pat. No. 5,459,976, issued to Weder et al., on Oct. 24, 1995, entitled "Material and Adhesive Strip Dispenser", the specification of which is hereby expressly incorporated in its entirety herein by reference. Each decorative wrapper 10aa of the pad or roll of wrappers may be connected or unconnected to the pad or roll. Preferably, each of the preformed decorative wrappers 10aa is releasably connected to each adjacent wrapper 10aa to form the pad 130aa. This allows each wrapper 10aa to be releasably disconnected from another wrapper 10aa by pulling the preformed decorative wrappers 10aa apart.

At least one of the plurality of wrappers 10aa is removed from the pad 130aa to provide a decorative wrapper 10aa having an open upper end 12aa, an open lower end 14aa, and a sidewall 16aa extending therebetween. The decorative wrapper 10aa is provided with an inner surface 19aa which surrounds an inner retaining space 20aa when disposed in an open condition.

A header 132aa is detachably connected to the upper end 12aa of each decorative wrapper 10aa. The header 132aa is preferably provided with a support means, such as a plurality of spaced apart holes 134aa, for allowing support of the preformed decorative wrappers 10aa from an extension member 140aa. A detaching element 136aa, such as a line of perforations, is provided for separating the header 132aa and the decorative wrapper 10aa so that the decorative wrapper 10aa can be readily detached from the header 132aa and positioned about a flower pot 22aa.

A portable extension member 140aa is provided with at least one hook 142aa extending from the portable extension member 140aa. While the portable extension member 140aa is depicted as having a plurality of spatially disposed hooks 142aa, it is to be understood that the portable extension member 140aa may only be provided with a single hook 142aa or three or more hooks 142aa. The selection of the number and disposition of the hook(s) 142aa is within the skill of a person in the art and is therefore fully within the scope of the presently disclosed and claimed inventive concept(s). The portable extension member 140aa may be capable of being secured to a person by straps (not shown). It should be understood that other means can be utilized for connecting the portable extension member to a person, such as a belt, strap, a clip, or a prong. The hooks 142aa are connected to the portable extension member 140aa such that the pad or plurality of wrappers 10aa can be supported on the portable extension member 140aa. While hooks have been shown for supporting a plurality of wrappers or sleeves, any suitable support may be used, including, but not limited to clips, wickets, staples, or straps. The portable extension member 140aa may also be provided with a plurality of apertures (not shown) extending vertically along the extension member to support the hooks so as to accommodate varying sizes of wrappers or sleeves. However, it should be understood that any such device may be used that provides support for a plurality of wrappers in accordance with the presently disclosed and claimed inventive concept(s). The hooks 142aa are adapted to be disposed through the holes 134aa provided in the header 132aa so that the hook 142aa holds the preformed decorative wrappers 10aa in a stable position. At least one of the preformed decorative wrappers 10aa may be partially or completely removed from the hooks 142aa to place the decorative wrapper 10aa in an opened condition. The decorative wrapper 10aa is placed about an outer peripheral surface 28aa of the pot 22aa. At least a portion of the inner surface 19aa of the decorative wrapper 10aa surrounds and engages a portion of the outer peripheral surface 28a of the pot 22aa. A portion of the decorative wrapper 10aa extends beyond an upper end 24aa of the pot 22aa. At least a portion of the lower end 26aa of the pot 22aa extends through the open lower end 14aa of the decorative wrapper 10aa.

The decorative wrapper 10aa may be secured to the pot 22aa by any of the methods described herein. In one embodiment, the decorative wrapper 10aa is secured to the pot 22a with a sleeve 40aa, as shown in the method of FIG. 30. Also, it will be understood by one of ordinary skill in the art that the decorative wrapper 10aa may be bondingly connected to the outer peripheral surface 28aa of the pot 22aa with a securing element. The securing element may be placed on the outer peripheral surface 28aa of the pot 22aa and/or the inner surface 48aa of the sleeve 40aa.

In FIG. 30, a plurality of sleeves 40aa are shown stacked one on top of the other to form a pad 144aa. Each of the sleeves 40aa has an upper end 42aa, a lower end 44aa, an outer surface 46aa, an inner surface 48aa, an inner space 50aa, and an upper opening 52aa at the upper end 42aa which is open to the inner space 50aa.

A header 150aa is detachably connected to the upper end 42aa of each sleeve 40aa in a similar manner as described herein previously in that the header 150aa is provided with a support element, such as a plurality of spaced apart holes 152aa. A detaching element 154aa, such as but not limited to a line of perforations, is also provided for separating the header 150aa and the sleeve 40aa so that the sleeve 40aa can be readily detached from the header 150aa and positioned about the decorative wrapper 10aa and the flower pot 22aa.

The pad 144aa of sleeves 40aa is shown as disposed on a portable extension member 156aa similar to the portable extension member 140aa and having at least one hook 158aa extending therefrom. While two spatially disposed hooks 158aa are shown in FIG. 30, it is to be understood that the portable extension member 156aa may be provided with a single hook 158aa, or three or more spatially disposed hooks 158aa. It should be understood that any such device may be used that provides support for the plurality of sleeves. The hook(s) 158aa are adapted to be disposed through the holes 152aa provided in the header 150aa so that the hook(s) 158aa hold the sleeves 40aa in a stable position. Each sleeve 40aa of the pad 144aa or roll of sleeves may be releasably connected to each adjacent sleeve. This allows each sleeve 40aa to be releasably disconnected from another sleeve 40aa by pulling the sleeves 40aa apart. The sleeve 40aa is detached from the header 150aa and disposed about at least a portion of the pot 22a and over at least a portion of the decorative wrapper 10aa surrounding the pot 10aa. The sleeve 40aa secures the decorative wrapper 10aa about the pot 22aa.

From the above description, it is clear that the presently disclosed and claimed inventive concept(s) is well-adapted to carry out the objects and to attain the advantages mentioned herein as well as those inherent in the presently disclosed and claimed inventive concept(s). While a presently preferred embodiment of the presently disclosed and claimed inventive concept(s) has been described, for purposes of this disclosure, it will be understood that numerous changes may be made which will readily suggest themselves to those skilled in the art and which are accomplished within the spirit of the presently disclosed and claimed inventive concept(s) disclosed and as defined in the appended claims.

What is claimed is:

1. A method of assembling a decorative plant package, comprising the steps of:
    obtaining a pot having an upper end, a bottom, an outer peripheral surface and an interior space;
    obtaining a preformed decorative wrapper having an initially flattened condition, the preformed decorative wrapper comprising a tubular body having an open upper end having an upper edge, an open lower end having a lower edge, an outer surface, an inner surface, an interior space and having a tapered portion, the preformed decorative wrapper having a flattened condition and an open condition;
    obtaining a preformed decorative cover for holding the preformed decorative wrapper in a position about the pot;
    opening the preformed decorative wrapper to an opened condition;
    placing the preformed decorative wrapper about the outer peripheral surface of the pot wherein at least a portion of the inner surface of the preformed decorative wrapper surrounds and engages a portion of the outer peripheral surface of the upper end of the pot and wherein at least a portion of the preformed decorative wrapper extends beyond the upper end of the pot and at least a portion of the bottom of the pot extends through the open lower end of the preformed decorative wrapper; and
    disposing the preformed decorative cover over a portion of the preformed decorative wrapper surrounding the pot, the preformed decorative cover securing the preformed decorative wrapper in a position about the pot, wherein the preformed decorative wrapper remains in place about the pot such that the open lower end of the preformed decorative wrapper is disposed adjacent an upper one-half of the pot and the upper edge of the preformed decorative wrapper is positioned a distance above the upper end of the pot, thereby forming a skirt for the pot.

2. The method of claim 1 wherein, in the step of obtaining a preformed decorative cover, the preformed decorative cover is substantially flexible.

3. The method of claim 1 wherein, in the step of obtaining a preformed decorative cover, the preformed decorative cover is substantially rigid.

4. The method of claim 1 wherein, in the step of obtaining a preformed decorative cover, the preformed decorative cover is an overpot.

5. The method of claim 1 wherein, in the step of obtaining a preformed decorative wrapper, the preformed decorative wrapper is constructed of a material selected from the group consisting of paper, cellophane, foil, polymer film, woven fabric, unwoven fabric, synthetic fabric, natural fabric, a material having an appearance or texture simulating the appearance or texture of cloth, a material having an appearance or texture simulating the appearance of paper, a matted material, and combinations thereof.

6. The method of claim 1, wherein the open lower end of the preformed decorative wrapper is disposed adjacent an upper one-third of the pot.

7. The method of claim 1, wherein the open lower end of the preformed decorative wrapper is disposed adjacent an upper one-fourth of the pot.

8. The method of claim 1 wherein, in the step of obtaining a preformed decorative wrapper, a design or decorative pattern is provided on at least a portion of the outer peripheral surface of the preformed decorative wrapper by a method selected from the group of printing, embossing, texturing, coloring, coating, and combinations thereof.

9. The method of claim 1 wherein, in the step of obtaining a preformed decorative wrapper, the upper end of the preformed decorative wrapper comprises a plurality of extending portions.

10. The method of claim 1 wherein, in the step of obtaining a preformed decorative wrapper, the lower end of the preformed decorative wrapper is contoured.

11. The method of claim 1 wherein, in the step of obtaining a preformed decorative wrapper, the lower end of the preformed decorative wrapper is linear.

12. The method of claim 1, wherein the upper end of the preformed decorative wrapper is linear.

13. The method of claim 1, wherein the upper end of the preformed decorative wrapper is non-linear.

14. The method of claim 1 wherein, in the step of obtaining a preformed decorative wrapper, the preformed decorative wrapper has a tubular, conical, or frustoconical shape.

15. The method of claim 1 wherein, in the step of obtaining a preformed decorative wrapper, the preformed decorative wrapper has an extension attached to at least a portion of the inner surface thereof.

16. The method of claim 15, wherein an upper end of the extension is substantially adjacent the upper end of the preformed decorative wrapper.

17. The method of claim 1, wherein the step of obtaining a preformed decorative wrapper is further defined as obtaining a plurality of preformed decorative wrappers in the form of a roll or pad and removing at least one of the preformed decorative wrappers to provide a preformed decorative wrapper having an open upper end, an open lower end, and a sidewall extending therebetween, wherein the preformed decorative wrapper is provided with an inner surface surrounding an inner retaining space when disposed in an open condition.

18. A method of assembling a decorative plant package, comprising the steps of:
obtaining a pot having an upper end, a lower end, an outer peripheral surface and an interior space;
obtaining a preformed decorative wrapper having an open upper end, an open lower end, and a sidewall extending therebetween, the preformed decorative wrapper having a flattened condition and an open condition wherein the decorative wrapper is provided with an inner surface surrounding an inner retaining space when disposed in the open condition;
placing the preformed decorative wrapper about the outer peripheral surface of the pot wherein at least a portion of the inner surface of the preformed decorative wrapper surrounds and engages a portion of the outer peripheral surface of the pot wherein at least a portion of the preformed decorative wrapper extends beyond the upper end of the pot and at least a portion of the bottom of the pot extends through the open lower end of the preformed decorative wrapper; and
securing a portion of the open lower end of the preformed decorative wrapper to the upper end of the outer peripheral surface of the pot, wherein the preformed decorative wrapper remains in place about the pot such that the open lower end of the preformed decorative wrapper is disposed adjacent an upper one-half of the pot and the upper edge of the preformed decorative wrapper is positioned a distance above the upper end of the pot, thereby forming a skirt for the pot.

19. The method of claim 18, further comprising the step of:
opening the preformed decorative wrapper to the opened condition.

20. The method of claim 18, wherein at least a portion of at least one of the preformed decorative wrapper and the pot is provided with a bonding material disposed thereon for securing a portion of the open lower end of the preformed decorative wrapper to the upper end of the outer peripheral surface of the pot.

21. The method of claim 18, wherein the preformed decorative wrapper is constructed of a material selected from the group consisting of paper, cellophane, foil, polymer film, woven fabric, unwoven fabric, synthetic fabric, natural fabric, a material having an appearance or texture simulating the appearance or texture of cloth, a material having an appearance or texture simulating the appearance of paper, a matted material, and combinations thereof.

22. The method of claim 18, wherein the open lower end of the preformed decorative wrapper is disposed adjacent an upper one-third of the pot.

23. The method of claim 18, wherein the open lower end of the preformed decorative wrapper is disposed adjacent an upper one-fourth of the pot.

24. The method of claim 18 wherein, in the step of obtaining a preformed decorative wrapper, a design or decorative pattern is provided on at least a portion of the outer peripheral surface of the preformed decorative wrapper by a method selected from the group of printing, embossing, texturing, coloring, coating, and combinations thereof.

25. The method of claim 18 wherein, in the step of obtaining a preformed decorative wrapper, the upper end of the preformed decorative wrapper comprises a plurality of extending portions.

26. The method of claim 18 wherein, in the step of obtaining a preformed decorative wrapper, the lower end of the preformed decorative wrapper is contoured.

27. The method of claim 18 wherein, in the step of obtaining a preformed decorative wrapper, the lower end of the preformed decorative wrapper is linear.

28. The method of claim 18, wherein the upper end of the preformed decorative wrapper is linear.

29. The method of claim 18, wherein the upper end of the preformed decorative wrapper is non-linear.

30. The method of claim 18 wherein, in the step of obtaining a preformed decorative wrapper, the preformed decorative wrapper has a tubular, conical, or frustoconical shape.

31. The method of claim 18 wherein, in the step of obtaining a preformed decorative wrapper, the preformed decorative wrapper has an extension attached to at least a portion of the inner surface thereof.

32. The method of claim 18, wherein an upper end of the extension is substantially adjacent the upper end of the preformed decorative wrapper.

33. The method of claim 18, wherein the step of obtaining a preformed decorative wrapper is further defined as obtaining a plurality of preformed decorative wrappers in the form of a roll or pad and removing at least one of the preformed decorative wrappers to provide a preformed decorative wrapper having an open upper end, an open lower end, and a sidewall extending therebetween, wherein the preformed decorative wrapper is provided with an inner surface surrounding an inner retaining space when disposed in an open condition.

34. The method of claim 1 wherein, in the step of disposing the preformed decorative cover over a portion of the preformed decorative wrapper, at least a portion of a floral grouping disposed in the pot is visible above the preformed decorative wrapper that remains about the pot.

35. The method of claim 18 wherein, in the step of securing a portion of the open lower end of the preformed decorative wrapper to the upper end of the outer peripheral surface of the pot, at least a portion of a floral grouping disposed in the pot is visible above the preformed decorative wrapper that remains about the pot.

\* \* \* \* \*

UNITED STATES PATENT AND TRADEMARK OFFICE
CERTIFICATE OF CORRECTION

PATENT NO. : 8,302,347 B2 Page 1 of 1
APPLICATION NO. : 12/782780
DATED : November 6, 2012
INVENTOR(S) : Donald E. Weder It is certified that error appears in the above-identified patent and that said Letters Patent is hereby corrected as shown below:

Column 5, line 40: Delete "112.5" and replace with -- 112.5° --

Column 5, line 40: Delete "135." and replace with -- 135°. --

Signed and Sealed this
Eighteenth Day of December, 2012

David J. Kappos
*Director of the United States Patent and Trademark Office*